United States Patent [19]

Simons

[11] 4,237,643
[45] Dec. 9, 1980

[54] FISHING LURE

[76] Inventor: James A. Simons, 2819 Hills Rd., Pineville, La. 71360

[21] Appl. No.: 43,116

[22] Filed: May 29, 1979

[51] Int. Cl.³ .............................................. A01K 83/02
[52] U.S. Cl. ........................................... 43/35; 43/36
[58] Field of Search ......................... 43/34, 35, 36, 37; 74/521

[56] References Cited

U.S. PATENT DOCUMENTS

| | | | |
|---|---|---|---|
| 1,486,028 | 3/1924 | Meighen | 43/37 X |
| 2,244,980 | 6/1941 | Abramson | 43/37 X |
| 2,474,481 | 6/1949 | Kleppen | 43/37 X |
| 2,491,546 | 12/1949 | Barnett | 43/36 |
| 2,543,501 | 2/1951 | Kleppen | 43/37 X |
| 2,597,832 | 5/1952 | Wolf | 43/37 X |

Primary Examiner—Nicholas P. Godici
Attorney, Agent, or Firm—Edgar E. Spielman, Jr.; David L. Ray

[57] ABSTRACT

An artificial fishing lure which may be fished within aquatic weeds without the lure hooks tangling themselves in the weeds is disclosed. The lure features a lure body having a hollow portion into which an automatically actuated hooking mechanism is housed. The hooking mechanism has a pair of hooks which are mounted at their shanks to a pivot rigidly mounted in the hollow portion. The hooks are originally within the housing and are arcuately movable about the pivot so that the hook points are outside the hollow portion and facing forward. To achieve this arcuate motion, an elongated V-shaped spring is slidably carried within the hollow portion and is attached at its leg ends to the hook ends. These points of connection will assume a position rearward of the pivot when the hooks are in the retracted position and within the hollow portion. When the points of connection are moved forward of the pivot, the spring action causes the hooks to move arcuately outward in the outside position and facing forward. This motion is achieved when the spring is pulled forward due to a fish strike thereby causing the fish to encounter the exposed hook points.

4 Claims, 6 Drawing Figures

FISHING LURE

BACKGROUND OF THE INVENTION

The utilization of artificial fishing lures having treble hooks attached to the exterior of the lure is well known in the art. While these fishing lures may be effective, they have a tendency to become entangled in any aquatic vegetation present resulting in loss of lure action or loss of the lure itself.

Several patents have been issued which disclose systems which allegedly overcome the problem of the lure hooks snagging the vegetation. For example, see U.S. Pat. Nos. 649,510; 1,486,028; 2,474,481; 2,543,501 and 2,597,832. It can be appreciated from a study of these patents that the various systems disclosed are extremely complex in nature and/or depend upon consistent spring tensions, sliding friction, etc. Since it is highly desirable to produce artificial fishing lures which are relatively inexpensive, the manufacturer tries to avoid systems requiring complex construction or requiring extremely high quality materials to achieve consistency of operation.

Therefore it is an object of this invention to provide an artificial fishing lure which is the paragon of simplicity and which could be made from inexpensive materials which do not require high quality control to insure consistency of performance.

The Invention

This invention relates to an artificial fishing lure which comprises: (a) a lure body having a hollow portion; (b) a pair of hooks mounted at their shanks to a pivot which is rigidly mounted in the hollow portion whereby each of the hooks is pivotable along an arc at which the points of the hooks are within the hollow portion at one extent of the arc and are oppositely opposed and facing forward outside the hollow portion at the other extent of the arc; (c) an elongated V-shaped spring slidably carried within the hollow portion along a line through the pivot, the spring having its legs biased inwardly with one of the legs pivotably connected to the shank end of one of the hooks and the other leg pivotably connected to the shank end of the other hook, the spring being slidable rearwardly to an extent to position the pivotal connection of the shank ends and the spring legs slightly rearward of the pivot and slidable forwardly to bring the connections forward of the pivot and on to a point whereby the hooks are facing forward and outside of the hollow portion; and (d) stop means to restrict the extent of the rearward travel of the spring.

In a preferred embodiment there is provided an adjustable stop means which may be adjusted to locate the pivotal connections within a certain range rearward of the pivot.

These and other features of a preferred embodiment of this invention contributing satisfaction in use and economy in manufacture will be more fully understood when taken in connection with the accompanying drawings in which identical numerals refer to identical parts and in which.

Figure 1:
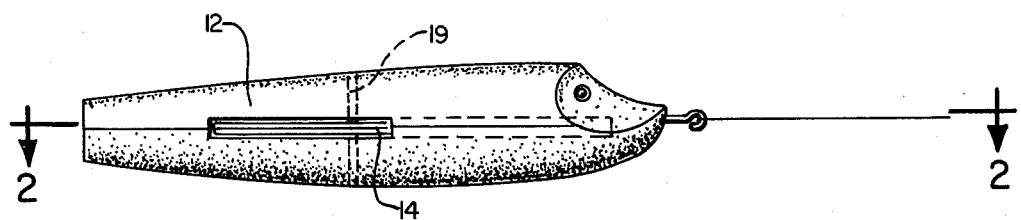
FIG. 1 is a side elevational view of an embodiment of this invention.

Referring now to FIGS. 1-6, it can be seen that an artificial lure of this invention, generally designated by the numeral 10, has a body 12 having a hollow portion 14 in which is situated an automatic hook setting mechanism, generally designated by the numeral 13. Body 12 has an upper and lower section which are separate during assembly of lure 10 but which are permanently affixed one to the other after assembly by glueing or screwing the two sections to each other. By having body 12 in two sections during assembly, positioning of mechanism 13 is facilitated.

Figure 2:
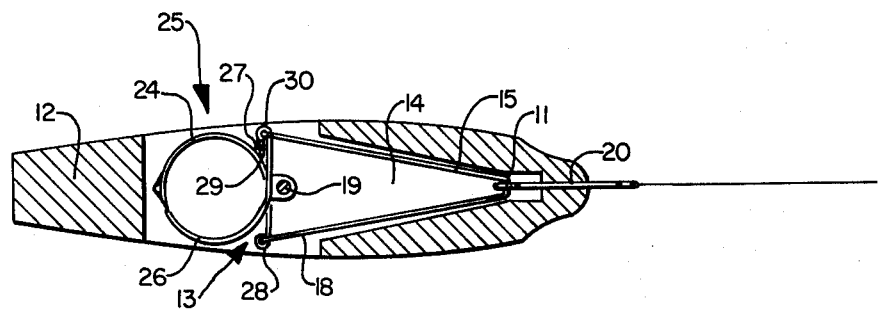
FIG. 2 is a sectional view taken through section lines 2—2 of FIG. 1 showing the hooks in the retracted position.
Figure 3:
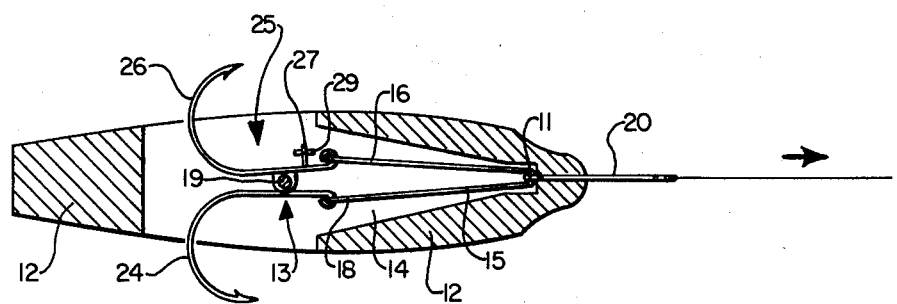
FIG. 3 is a sectional view taken through section lines 3—3 showing the hooks in the exposed position.
Figure 4:
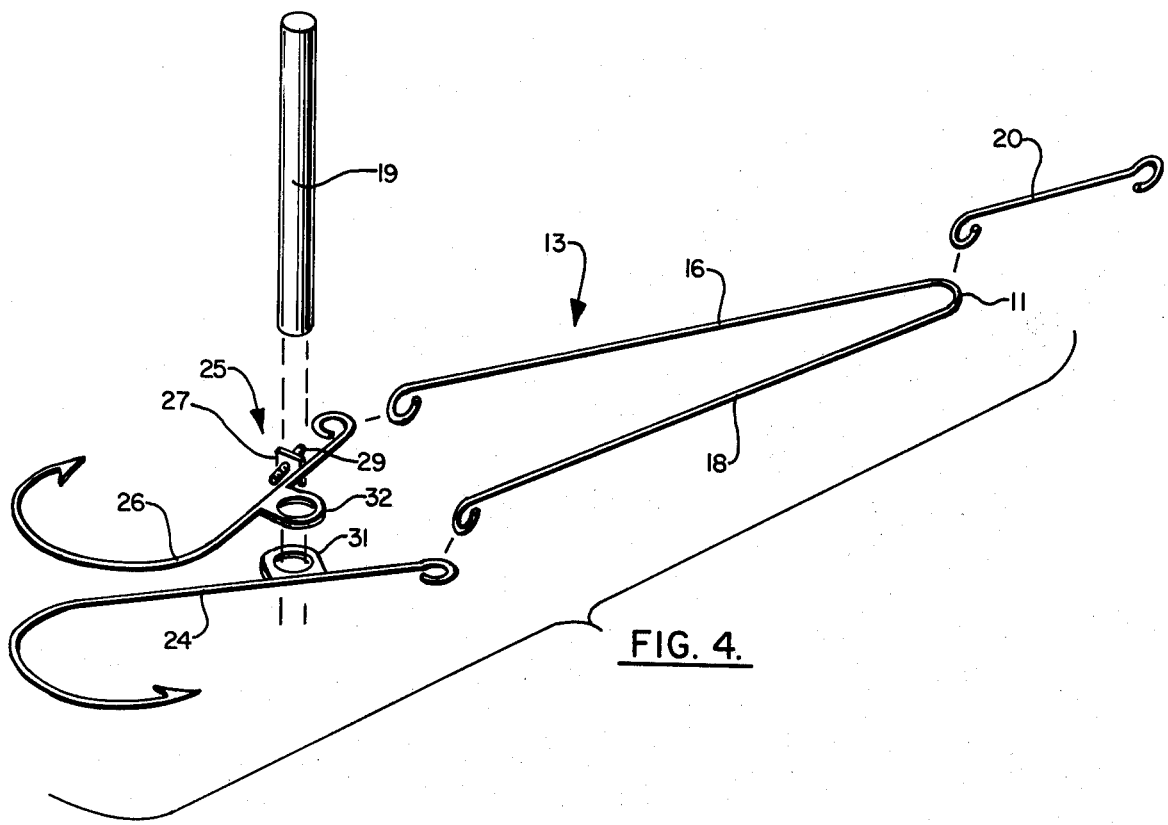
FIG. 4 is an exploded view showing the automatically actuated hooking mechanism utilized in the embodiment shown in FIG. 1.
Figure 5:
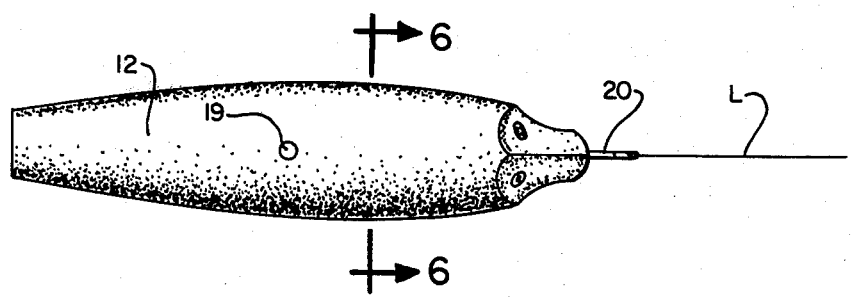
FIG. 5 is a top plan view of the embodiment shown in FIG. 1.
Figure 6:
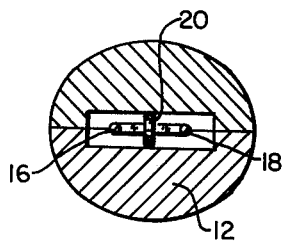
FIG. 6 is a sectional view taken through section lines 6—6 of FIG. 5.

As can be seen in FIGS. 2 and 3, hollow portion 14 has a configuration which accommodates mechanism 13. Mechanism 13 comprises V-shaped spring 15 having legs 16 and 18 which are pivotably connected to hooks 24 and 26 at their shank ends 28 and 30, respectively. Spring 15 is designed so that legs 16 and 18 are biased toward each other. This connection is easily achieved by forming of loops which is detailed in FIG. 4. By using this loop-type connection, economy in manufacture is realized. At the opposite end of V-shaped spring 15 there is attached tether 20 which also accomplishes its attachment by means of a loop end. At the distal end of tether 20 there is attached line L.

Approximately midway the shank portion of hooks 24 and 26 there is provided eyes 31 and 32, respectively. Eyes 31 and 32 have apertures which rotatably receive pivot 19. Pivot 19 is rigidly affixed to body portion 12 by either screwing or glueing of the pivot to body 12.

On the mechanism, hook 26 in the case of the embodiment shown, there is provided a stopping structure, generally designated by the numeral 25, which features a threaded nut into which a threaded adjustment screw 29 is received. If it is not desirable to have an adjustable stop structure, it is within the scope of this invention to utilize a protuberance on the mechanism which will come into interfering contact with the mechanism when the hooks are in the retracted position to prevent further rearward movement of V-shaped spring 15.

The body of the lure of this invention can be made of any conventional material such as wood or plastic. Hooks 24 and 26 are conventional hooks which are modified in accordance with the structure required by this invention. V-shaped spring 15 should be of any material having resiliency and which is preferably corrosion resistant.

In operation lure 10 is attached to line L. Hooks 24 and 26, if they are not within hollow portion 14, can be so placed by pushing tether 20 towards the rear of lure 10. When tether 20 is pushed to the rear, V-shaped spring 15 likewise moves to the rear until the pivotal connections between the spring ends and the hook shank ends are located at a point slightly to the rear of pivot 19. Since spring legs 16 and 18 are biased towards each other they apply a force towards the center line of lure 10 which results in hooks 24 and 26 being held in the retracted position. Stop structure 25, if adjustable, can be adjusted to determine the extent of the rearward location of the pivotal connection. The significance of such location will be hereinafter described.

With hooks 24 and 26 in the retracted position, the lure is ready for use. Lure 10 may be cast amongst aquatic vegetation with no snagging of such vegetation by hooks 24 and 26 as they are within hollow portion 14 and thus unable to snag such vegetation. As the lure is retrieved towards the fisherman, any strike by a fish will cause lure 10 to be halted. Since the fisherman will be continuing his retrieve of lure 10, a force towards the fisherman will be exerted through line L to V-shaped spring 15, as is shown in FIG. 3. As V-shaped spring 15 moves forward, the location of the pivotal connections will move forward of pivot 19 which will allow the spring action of spring 15 to bring the pivotal connections towards one another as is shown in FIG. 3. Since hooks 24 and 26 are pivoted about pivot 19, they will rotate and achieve an opposing position with the points faced forward. Since the fish will have the lure in his mouth, the hooks will be in a position to contact the fish and hook it.

As mentioned previously, for the embodiment shown, an adjustable stop structure 25 is shown. When screw 27 is screwed outwardly from nut 29, the position of the pivotal connections will move further to the rear of pivot line a—a shown in FIG. 2. As can be appreciated, the farther rearward the pivotal connections move the greater forward force necessary to actuate mechanism 13 is achieved. When screw 27 is screwed inwardly, interference with hook 24 is advanced so that the pivotal connections are positioned closer to pivot line a—a thereby making the actuation of mechanism 13 dependent upon much less force through line L. The fisherman therefore can adjust mechanism 13 to actuate upon application of different size forces transmitted through line L. Such adjustment is desirable so that the lure can be fine tuned depending upon the type of fish fished for, the depth of water in which the lure will be utilized, the stiffness of rod used, etc.

Not only can the automatic hook setting mechanism 13 of this invention be used in conjunction with an artificial lure 10, but also the automatic hook setting mechanism can be used with live bait. In this configuration, automatic hook setting mechanism 13 would be attached at pivot 19 to the live bait. Live bait such as small crawfish, minnows, etc., can be wired so that they attain firm attachment to pivot 19. When the fish strikes the live bait continued pull on tether 20 by the fisherman as he retrieves the bait will cause hooks 24 and 26 to spring outwardly and hook the fish as soon as the pivotal connections move forward of pivot 19. The manner in which the bait is attached to pivot 19 is not critical as long as the bait is not allowed to tear therefrom.

What is claimed is:

1. A weedless, artificial fishing lure comprising:
   a. a lure body, said body having a hollow portion;
   b. a pair of hooks mounted at their shanks to a pivot rigidly mounted in said hollow portion whereby each of said hooks is pivotable along an arc at which the points of said hooks are within said hollow portion at one extent of the arc and are oppositely opposed and facing forward outside of said hollow portion at the other extent of said arc;
   c. an elongated V-shaped spring slidably carried within said hollow portion along a line through said pivot, said spring having its legs biased inwardly with one of said legs pivotably connected to the shank end of one of said hooks and the other of said legs pivotably connected to the shank end of the other of said hooks, said spring being slidable rearwardly to an extent to position said pivotal connection of said shank ends and said spring legs slightly rearward of said pivot and slidable forwardly to bring said connections forward of said pivot and on to a point whereby said hooks are facing forward and outside of said hollow portion, said bias provided by said V-spring being substantially the sole resistance to said forward sliding of said V-spring from its said rearward extent to its said point forward of said pivot; and
   d. stop means to restrict the extent of said rearward travel of said spring.

2. The artificial fishing lure of claim 1 wherein said stop means is mounted to one of said hook shanks so that it will come into interfering engagement with said other hook shank to prevent further rearward movement.

3. The artificial fishing lure of claim 2 wherein said stop means is adjustable to determine the extent of rearward travel.

4. The artificial fishing lure of claim 1 wherein said hollow portion has a slot through the horizontal axis of said lure body and dimensioned to receive said hooks.

* * * * *